United States Patent

Nepela et al.

[11] Patent Number: 6,078,479
[45] Date of Patent: *Jun. 20, 2000

[54] MAGNETIC TAPE HEAD WITH FLUX SENSING ELEMENT

[75] Inventors: Daniel A. Nepela, San Jose; Erich P. Valstyn, Los Gatos; Derek Jan Kroes, Fremont, all of Calif.

[73] Assignee: Read-Rite Corporation, Milpitas, Calif.

[*] Notice: Under 35 U.S.C. 154(b), the term of this patent shall be extended for 1285 days.

[21] Appl. No.: 08/500,741

[22] Filed: Jul. 11, 1995

Related U.S. Application Data

[63] Continuation-in-part of application No. 08/387,395, Feb. 13, 1995, abandoned, which is a continuation of application No. 08/103,669, Aug. 10, 1993, abandoned.

[51] Int. Cl.[7] .......................... G11B 5/127; G11B 5/147; G11B 5/39
[52] U.S. Cl. .......................... 360/113; 360/119; 360/126
[58] Field of Search .................................. 360/112, 113, 360/126, 119, 122

[56] References Cited

U.S. PATENT DOCUMENTS

| 4,577,250 | 3/1986 | Sato et al. ............................... 360/112 |
| 5,097,371 | 3/1992 | Somers ................................... 360/113 |
| 5,097,372 | 3/1992 | Fukazawa et al. ....................... 360/113 |
| 5,255,141 | 10/1993 | Valstyn et al. ........................... 360/126 |

FOREIGN PATENT DOCUMENTS

| 0514976 | 11/1992 | European Pat. Off. ............... 360/113 |
| 5998319 | 11/1982 | Japan ..................................... 360/113 |
| 59-77618 | 5/1984 | Japan ..................................... 360/113 |
| 344811 | 2/1991 | Japan ..................................... 360/113 |
| 3-66015 | 3/1991 | Japan ..................................... 360/113 |
| 4-48422 | 2/1992 | Japan ..................................... 360/119 |

*Primary Examiner*—William Klimowicz
*Attorney, Agent, or Firm*—Nathan N. Kallman

[57] ABSTRACT

A thin film read-write magnetic head useful in a tape apparatus includes a magnetic circuit consisting of two thin film magnetic layers which form a magnetic yoke that is divided into three closely spaced sections, the central section of at least one of the magnetic layers containing an interspace in which a flux sensing element, such as a magnetoresistive device or Hall effect device, is located. The three section yoke forms a continuous magnetic circuit, except for the transducing gap, which circuit consists of three sections corresponding to the three sections of the yoke. The total gap width determines the width of the data track being recorded. During the write mode, a magnetic valve including an electrical conductor provides a shunt path to bypass the flux sensing means so that all three sections of the head operate for recording. During the read mode, only the central yoke section and its transducing gap portion sense the data signal recorded on the magnetic tape, and the read element detects the sensed signal. A saturation current is directed to the valve conductor during the read mode so that the shunt path is open, thereby allowing the flux sensing means to operate and sense the readout signal.

4 Claims, 2 Drawing Sheets

MAGNETIC TAPE HEAD WITH FLUX SENSING ELEMENT

This application is a continuation-in-part application Ser. No. 08/387,395, filed Feb. 13, 1995, now abandoned, which was a continuation of application Ser. No. 08/103,669, filed Aug. 10, 1993, now abandoned.

CROSS-REFERENCE TO COPENDING PATENT APPLICATION

U.S. Pat. No. 5,255,141 which issued Oct. 19, 1993, discloses a read-write magnetic head which incorporates a thin film inductive write head and a flux sensing read element. The subject matter of this patent is incorporated herein by reference.

FIELD OF THE INVENTION

This invention relates to a thin film magnetic head useful in tape storage apparatus and in particular to a magnetic head assembly incorporating an inductive write head and a flux sensing read element.

DESCRIPTION OF THE PRIOR ART

Thin film magnetic heads or transducers typically employ inductive elements for recording and reading data. As is well known, thin film magnetic heads comprise a first magnetic layer, designated as P1, and a second magnetic layer, designated as P2, both preferably made of Permalloy. The P1 and P2 layers make contact at a back closure to form a magnetic yoke having a continuous magnetic path with a transducing gap between the P1 and P2 layers. During the recording or write mode, electrical signals representative of data are directed to the transducer and are recorded as magnetic flux signals on an associated surface of a magnetic disk or tape. During the read mode, the recorded magnetic flux signals are sensed and transduced by the transducer to produce electrical signals which are read out as data for further utilization.

It is known that magnetoresistive (MR) and Hall effect devices may be used as flux sensing elements to implement the readout function. Flux sensing elements can be used in disk drives or with tape storage apparatus. In a conventional recording head having an MR read transducer, the write and read sections of the head must be carefully aligned with each other to effectuate proper track following for writing and reading data. The lateral region of sensitivity (which is the read width) is determined by the length of the MR transducer. This transducer length must be approximately equal to the width of the data track to be read. In contrast, in the MR head disclosed in the aforementioned copending patent application, the MR element is positioned in a space between portions of the P2 or P1 layer.

Magnetic heads are used extensively in disk drives with rigid or flexible disks and in tape storage apparatus having flexible tape. Flexible tape tends to wobble or deviate from a precise straight linear motion as the tape is transported from the supply reel to the takeup reel in a tape apparatus. Magnetic tape also is subject to stretch due to thermal and mechanical effects. To compensate for these undesirable characteristics of tape, it has been proposed to write wide data tracks and to read a relatively narrow portion of the recorded data tracks to obtain an accurate readout signal. To implement the write wide, read narrow functions, separate write heads and read heads with different size transducing gaps are typically used. With such an arrangement, proper alignment of the write and read heads is required, and thus production cost is increased. In addition, separate heads require more space.

SUMMARY OF THE INVENTION

An object of this invention is to provide a read-write thin film magnetic head for use with a magnetic tape apparatus having an inductive write section and a flux sensing read element which does not require alignment of the write section and read element.

Another object of this invention is to provide a read-write thin film magnetic head which enables writing wide data tracks and reading narrow portions along the recorded tracks.

Another object is to provide a read-write thin film magnetic head for use with a magnetic tape apparatus having an inductive write section and a flux sensing read element which is fabricated as an integral body.

A further object is to provide a read-write thin film magnetic head for use with a magnetic tape apparatus having an inductive write section and a flux sensing read element which allows a reduction in manufacturing tolerance problems. A still further object is to provide a read-write thin film magnetic head for use with a magnetic tape apparatus having an inductive write section and a flux sensing read element that realizes a savings in space.

According to this invention, a read-write thin film magnetic head useful in a tape storage apparatus comprises a thin film inductive write transducer comprising P1 and P2 magnetic layers forming a magnetic yoke, a flux sensing read element and a valve conductor. The magnetic yoke of the write transducer is patterned with a major central section and two auxiliary side sections closely spaced from the central section. The two side sections are preferably mirror images of each other. Accordingly, the transducing gap consists of a central section and two side sections, each gap section being formed by the corresponding yoke section. The central section and two side sections are formed of a material having substantially the same magnetic reluctance. The flux sensing read element, which preferably is an MR element, is located within an interspace between two portions of the central section of the P1 or P2 layer. The valve conductor is disposed in a shunt path coupled to the primary magnetic circuit of the head.

During the write mode, the data track is written wide and is substantially of the same width as the total width of the transducing gap. The data track is divided into three closely spaced portions corresponding in width dimensions to the widths of the three closely spaced sections of the transducing gap. During the write mode, the valve conductor is not energized and the flux sensing element is shunted, so that the magnetic flux bypasses the MR element and the head functions as a conventional thin film head. In the read mode, current is passed through the valve conductor to saturate the magnetic material surrounding the valve conductor. As a result, flux entering the central yoke of the head is sensed by the MR element whereby data signals are read out. The width of the narrow portion of the recorded track that is read is approximately the width of the central section of the transducing gap formed between the P1 and P2 layers. The write wide, read narrow tape apparatus affords an improved readout signal with a higher output than that previously obtained with prior art tape apparatus.

DESCRIPTION OF THE DRAWING

The invention will be described in greater detail with reference to the drawing in which.

Similar numerals refer to similar elements throughout the drawing.

DETAILED DESCRIPTION OF THE INVENTION

Figure 1:
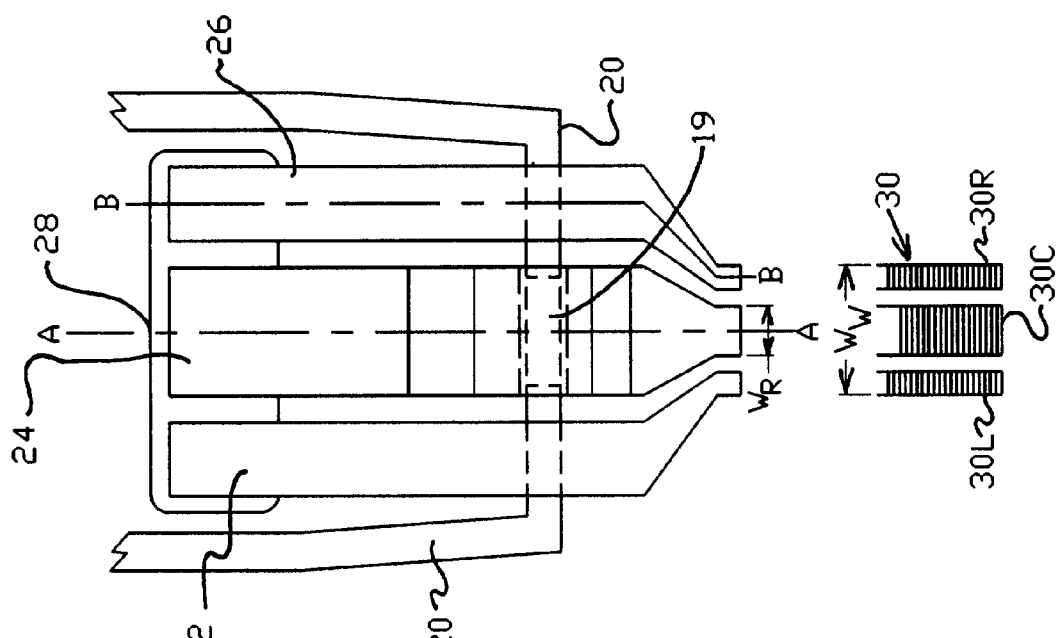
FIG. 1 is a top plan view of a write wide, read narrow thin film magnetic head for use in a tape apparatus, in accordance with this invention.
Figure 2:
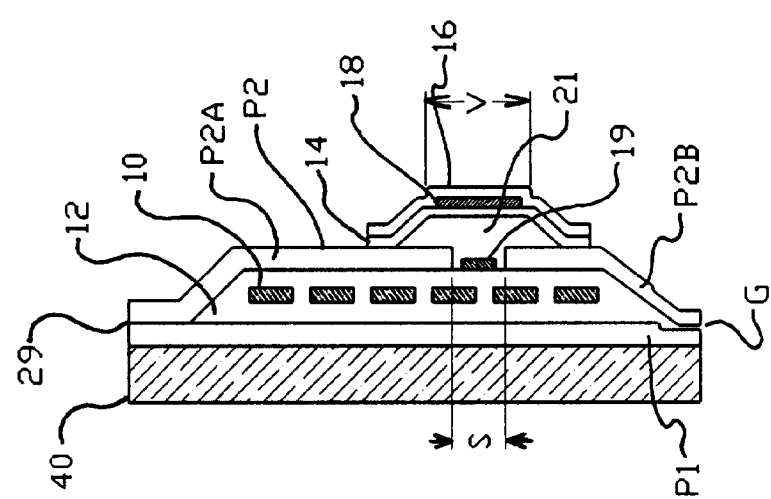
FIG. 2 is a cross-section taken through line A—A of FIG. 1.
Figure 3:
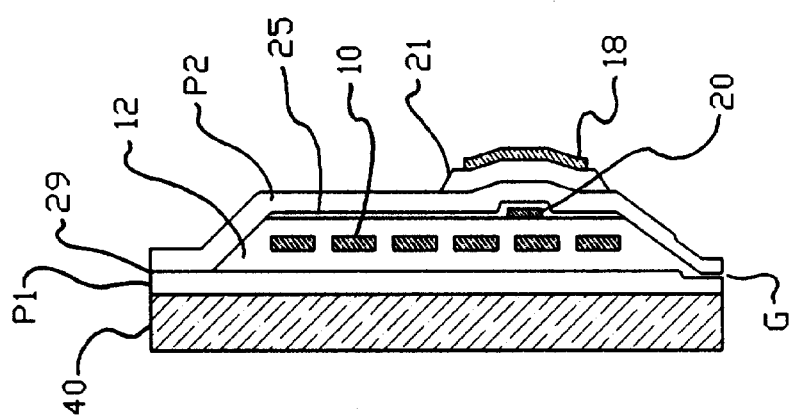
FIG. 3 is a cross-section taken through line B—B of FIG. 1.

With reference to FIGS. 1–3, a thin film magnetic head for use with a tape apparatus includes Permalloy magnetic layers P1 and P2 which form a magnetic yoke with a transducing gap G therebetween. The P1 and P2 layers are deposited over a ceramic substrate 40. A via or through hole 28 is provided to allow the P1 and P2 layers to make contact and form a back closure 29, thereby forming a continuous magnetic path interrupted by the nonmagnetic transducing gap. A conductive coil or winding 10, made of copper turns, is embedded in an insulating material 12 which is deposited between the P1 and P2 layers.

In accordance with this invention, an MR sensor 19 having a defined easy axis of magnetization is provided along the magnetic circuit path in an interspace or well between portions P2A and P2B of the central section of the P2 layer. The MR sensor 19, which is made from a Permalloy material having a thickness of about 200–500 Angstroms, is encompassed by an insulating material 21. The length of the MR sensor can be made longer than the width of the recorded tracks since the lateral sensitivity is determined by the width of the pole tips and not by the length of the MR transducer.

A valve conductor 18 is formed between Permalloy layers 14 and 16 which are deposited above the insulating layer 21 and the P2 layer. The Permalloy layers 14 and 16 are in contact with the P2 layer thereby forming a continuous flux path for completing the write magnetic circuit. The valve conductor 18 is formed from one or more copper turns with insulation provided between them and the Permalloy layers 14 and 16. The valve conductor 18 and the magnetic layers 14 and 16 form a magnetic valve capable of opening and closing the magnetic shunt path provided by layers 14 and 16.

In keeping with this invention, the pattern of each of the P1 and P2 Permalloy layers includes a central section 24 bounded by closely spaced side yoke sections 22 and 26, which are substantially mirror images of each other. The central section 24 and the side yoke sections 22 and 26 are formed of a nickel-iron alloy material having substantially the same magnetic reluctance. The sections 24, 22 and 26 of the P2 layer are in substantial vertical alignment with the respective sections of the P1 layer. The pole tip region of the P1 and P2 layers is narrowed to define the width of the transducing gap. Each of the side sections 22 and 26 is separated but closely spaced from the central section 24 by about 1–4 micrometers (microns), by way of example. The outer side sections 22 and 26 act as shields during the read mode thereby improving off-track performance of the tape apparatus. Additionally the width of the central yoke section 24 can range from about 15 to 60 microns and the widths of the side yoke sections 22, 26 can range from about 5–60 microns.

During the write mode, a write track 30 having a width $W_w$ substantially Equal to the total width of the transducing gap G is recorded. The track 30 may be recorded longitudinally, helically, transversely or by perpendicular or vertical recording techniques. The width of the write track 30 that is registered during the write mode is defined by closely spaced track portions 30L, 30C, 30R that are recorded and have a width corresponding to the total width of the transducing gap formed by yoke sections 22, 24, 26 at the air bearing surface, i.e., at the transducing gap.

During the write mode, the valve conductor 18 is not energized and is inactive so that the signals representing data to be recorded bypass the MR element 19 and are directed through the Permalloy branches 14 and 16 that surround the valve conductor 18. The write data signals are transduced at the nonmagnetic gap G and recorded on a storage medium, such as a magnetic tape. During the read mode, a current of about 25 milliampere turns, for example, is applied to the valve conductor 18 to saturate the magnetic material of the Permalloy layers 14 and 16. The magnetic layers 14 and 16 together have substantially the same thickness as the P2 layer, which may be about 2 to 3 microns by way of example When magnetic flux from the recorded medium is detected at the gap formed by the pole tips of the P1 and P2 layers, the MR element 19 senses the flux as a readout signal.

During the read mode, the MR element needs to be energized with a DC current supplied through conductors 20, shown in FIG. 1. MR element 19 and valve conductor 18 can be dimensioned in such a way so that they are connected in series. This does not significantly affect the read efficiency, since the MR element 19 has a much higher resistance than valve conductor 18. Moreover, by making the thickness of layer 14 and the thickness of layer 16 different from each other, while keeping their sum equal to the thickness of layer P2, a DC bias field may be generated at MR element 19, making any other biasing means unnecessary. Auxiliary bias of the MR element, if needed, can be provided by soft bias, permanent magnet bias or shunt bias means, as is known in the art. Additionally, longitudinal bias can also be provided by antiferromagnetic or permanent magnet bias means.

Figure 4:
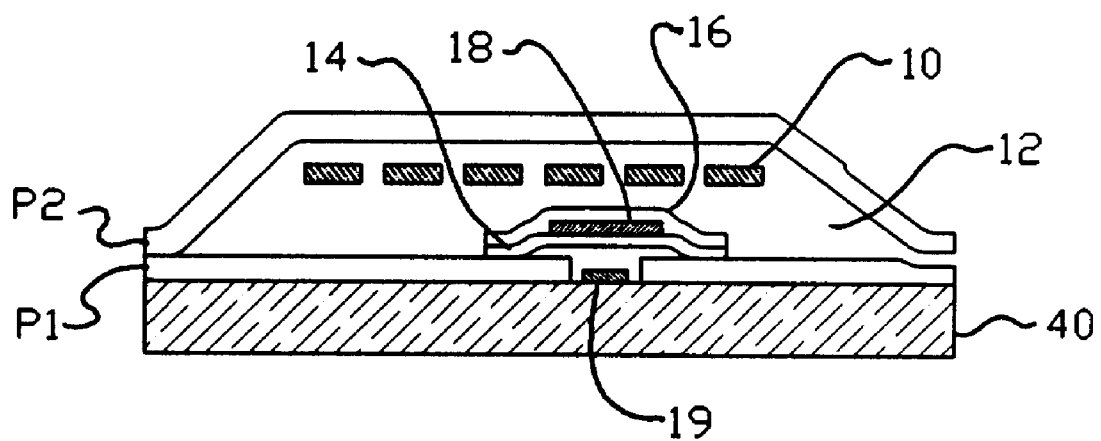
FIG. 4 is a cross-sectional view of an alternative embodiment of the invention.

In the alternative embodiment illustrated in FIG. 4, the MR sensor 19 is located in a hiatus or interspace in the P1 layer, instead of the P2 layer as in the embodiment depicted in FIG. 2. Accordingly, in the implementation of FIG. 4, the valve conductor structure, which includes elements 14, 16 and 18, is located above the MR sensor 19 and below the coil 10. The MR sensor element 19 and valve conductor 18 may be connected in parallel.

Figure 5:
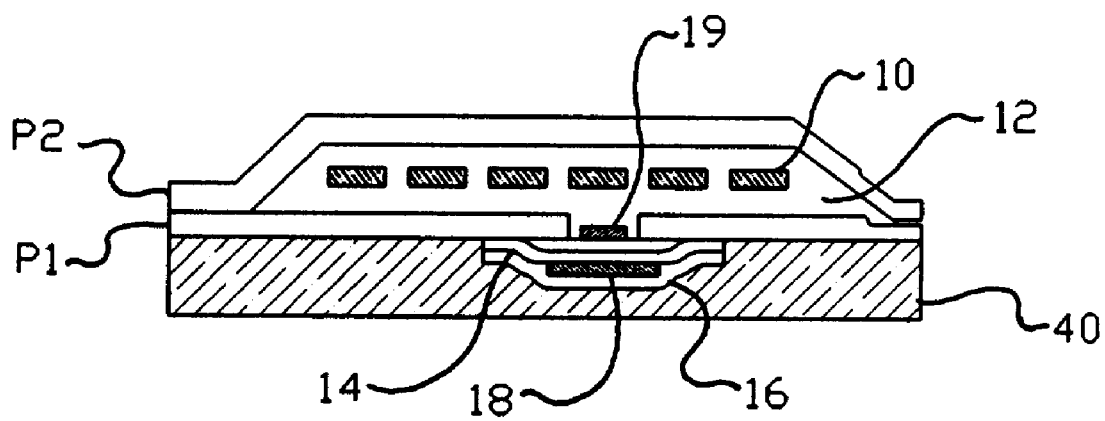
FIG. 5 is a cross-sectional view of another alternative embodiment of the invention.

In the embodiment of FIG. 5, the MR sensor 19 is also located in the interspace in the P1 layer, but the valve conductor assembly, including elements 14, 16 and 18, is inverted and disposed in a recess formed in the substrate 40.

As is well known in the art, wiring and vias are used to make the necessary electrical connections, including connection to external circuitry, but are not completely shown for convenience and clarity of illustration of the drawing.

The invention disclosed herein solves several problems that have been encountered with read-write magnetic heads using flux sensors for the read function, whereby manufacturing tolerance problems are alleviated. When used in a tape storage apparatus, the write wide, read narrow thin film head affords proper track following and improved off-track performance. The problem of alignment of the MR read element and the write transducer is obviated by virtue of the novel configuration. Also, thermal noise spikes and Barkhausen noise are eliminated or minimized. With the design disclosed herein, the read signal output is significantly improved with an enhanced signal-to-noise ratio.

The device disclosed herein affords a higher spatial resolution than a conventional MR read head because the gap length can be made smaller than that of a conventional MR head. The MR element can be placed sufficiently far away from the pole tips to experience only negligible temperature excursions during contact with asperities of the magnetic medium surface.

It should be understood that the invention is not limited to the specific parameters, materials and dimensions described by way of example, which may be modified within the scope of the invention.

What is claimed is:

1. A thin film read-write magnetic head for use with a magnetic medium on which data tracks are recorded and read out comprising:

first and second magnetic layers for forming a magnetic yoke with a nonmagnetic transducing gap and having at least three separate closely spaced sections, all of said three sections each being formed of material having substantially the same magnetic reluctance, wherein the total width of said nonmagnetic transducing gap defined by said three sections delineates the total width of said recorded data tracks, the center section of at least one of said layers having an interspace formed therein;

flux sensing means disposed within said interspace for sensing a readout signal;

write coil means disposed between said first and said second magnetic layers;

magnetic valve conductor means coupled to said magnetic yoke adjacent said flux sensing means;

said magnetic valve conductor means being disposed between said write coil means and said flux sensing means; and means for magnetically saturating said magnetic valve conductor means during sensing of said readout signal and for providing a magnetic shunt around said flux sensing means during signal recording by said write coil means.

2. A magnetic head as in claim 1, wherein said magnetic valve conductor means comprises third and fourth magnetic layers disposed in vertical alignment with said interspace.

3. A magnetic head as in claim 1, wherein adjacent ones of said closely spaced sections are spaced at about 1–4 microns.

4. The magnetic head of claim 1 including means for electrically connecting said magnetic valve conductor means to said flux sensing means.

* * * * *